United States Patent [19]
Tsai

[11] Patent Number: 5,995,244
[45] Date of Patent: Nov. 30, 1999

[54] MULTIPLE RESOLUTION PAGE SCANNER

[76] Inventor: Shui Chuan Tsai, No. 3, Alley 80, Lane 108, Sec. 1, Kuang-Fu Road, Hsin-Chu, Taipei, Taiwan

[21] Appl. No.: 08/900,402

[22] Filed: Jul. 23, 1997

[51] Int. Cl.⁶ .............................. H04N 1/04; G06K 9/22
[52] U.S. Cl. .......................................... 358/474; 382/315
[58] Field of Search ................................. 358/474, 471, 358/473, 475, 484, 491, 494, 496, 497; 382/312, 313, 315, 317

[56] References Cited

U.S. PATENT DOCUMENTS

| | | | |
|---|---|---|---|
| 4,217,043 | 8/1980 | Momose | 354/25 |
| 4,323,308 | 4/1982 | Kitajima | 355/57 |
| 5,431,389 | 7/1995 | Wensink | 271/273 |
| 5,814,809 | 9/1998 | Han | 250/208.1 |

*Primary Examiner*—Jerome Grant, II
*Attorney, Agent, or Firm*—Pro-Techtor International Services

[57] ABSTRACT

The present invention relates to a multiple resolution page scanner, having a base, a main body and a feeding path between the base and the main body for transporting a sheet to be scanned in a longitudinal direction therethrough by a transport mechanism, the main body having several mirrors, the multiple resolution page scanner further having an illuminating system for illuminating the sheet, when it passes through the feeding path, with an image of the sheet projected towards the mirrors, passing one of at least two mirror groups, one of at least two lenses of different optical resolutions and reaching a detector, wherein various optical resolutions are attained by alternatively bringing one of the at least two lenses and one of the at least two mirror groups into the light path.

3 Claims, 10 Drawing Sheets

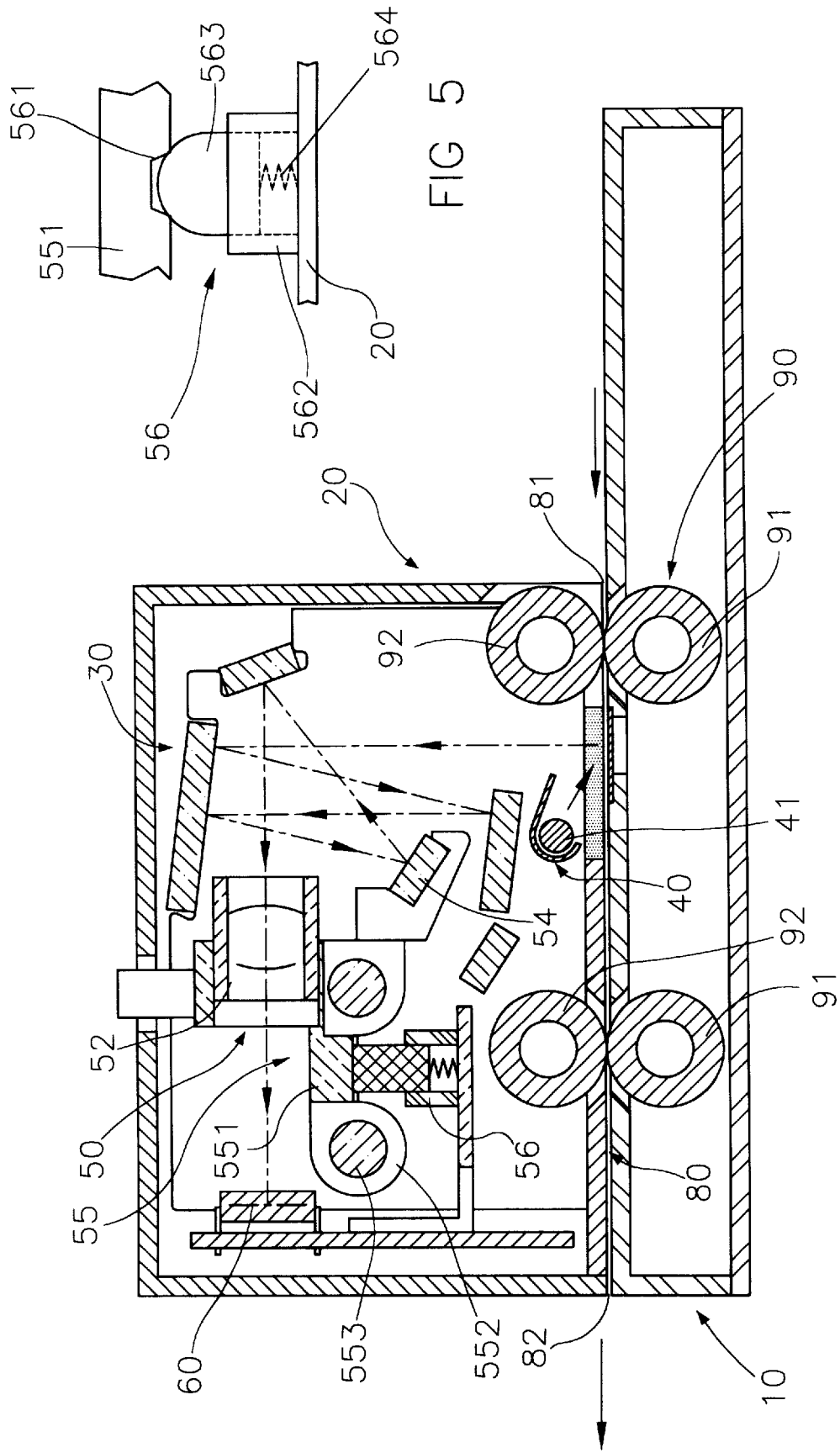

MULTIPLE RESOLUTION PAGE SCANNER

BACKGROUND OF THE INVENTION

1. Field of the Invention

The present invention relates to a multiple resolution page scanner, particularly to a page scanner for scanning under at least two resolutions, with the scanned area transmitting or reflecting the illuminating light.

2. Description of Related Art

For scanning text on an A4 sheet, a resolution of 300 dpi is most common. Color photographs, however, require scanning at a resolution of at least 600 dpi over 4 inch size. Conventional sheet-fed page scanners use only one lens and consequently operate at only one resolution. So there are different scanners on the market for A4 texts with 300 dpi resolution and for 4 inch images with 600 dpi resolution. The purchaser of a scanner has to make a choice based on the material to be scanned, i.e., buying a scanner for a relatively large area at a lower resolution (A4 at 300 dpi) or for a relatively small area at a higher resolution (like 4 inch at 600 dpi). If scanning of a relatively large area and at a higher resolution is required, two scanners have to be bought. This is not only a space-consuming, but also an uneconomic solution. Furthermore, conventional page scanners work only with light reflected on the scanned area, so no transparents can be scanned, restricting the scope of the scanner.

SUMMARY OF THE INVENTION

An object of the present invention is to provide a multiple resolution page scanner, which operates under at least two resolutions.

Another object of the present invention is to provide a multiple resolution page scanner, which is economical for the user.

A further object of the present invention is to provide a multiple resolution page scanner, which works with scanned sheets that are illuminated by reflection and with scanned sheets that are illuminated by transmission.

The present invention can be more fully understood by reference to the following description and accompanying drawings.

BRIEF DESCRIPTION OF THE DRAWINGS

FIG. 4 is a sectional view of FIG. 3, taken along line B—B.

FIG. 5 is a schematic illustration of the limiting system of the multiple resolution page scanner of the present invention.

DETAILED DESCRIPTION OF THE PREFERRED EMBODIMENTS

Figure 1:
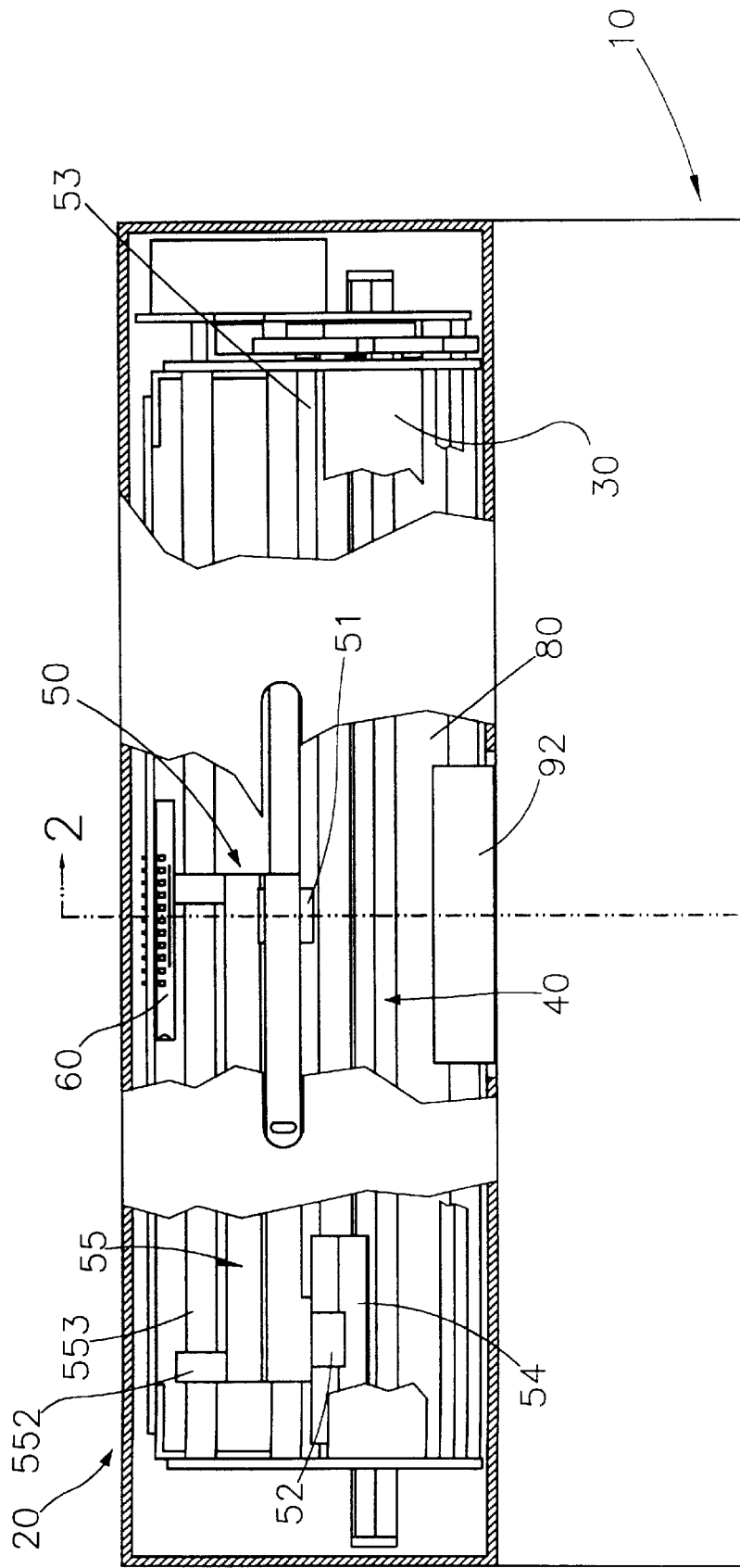
FIG. 1 is a top view of the multiple resolution page scanner of the present invention in the low resolution state.
Figure 2:
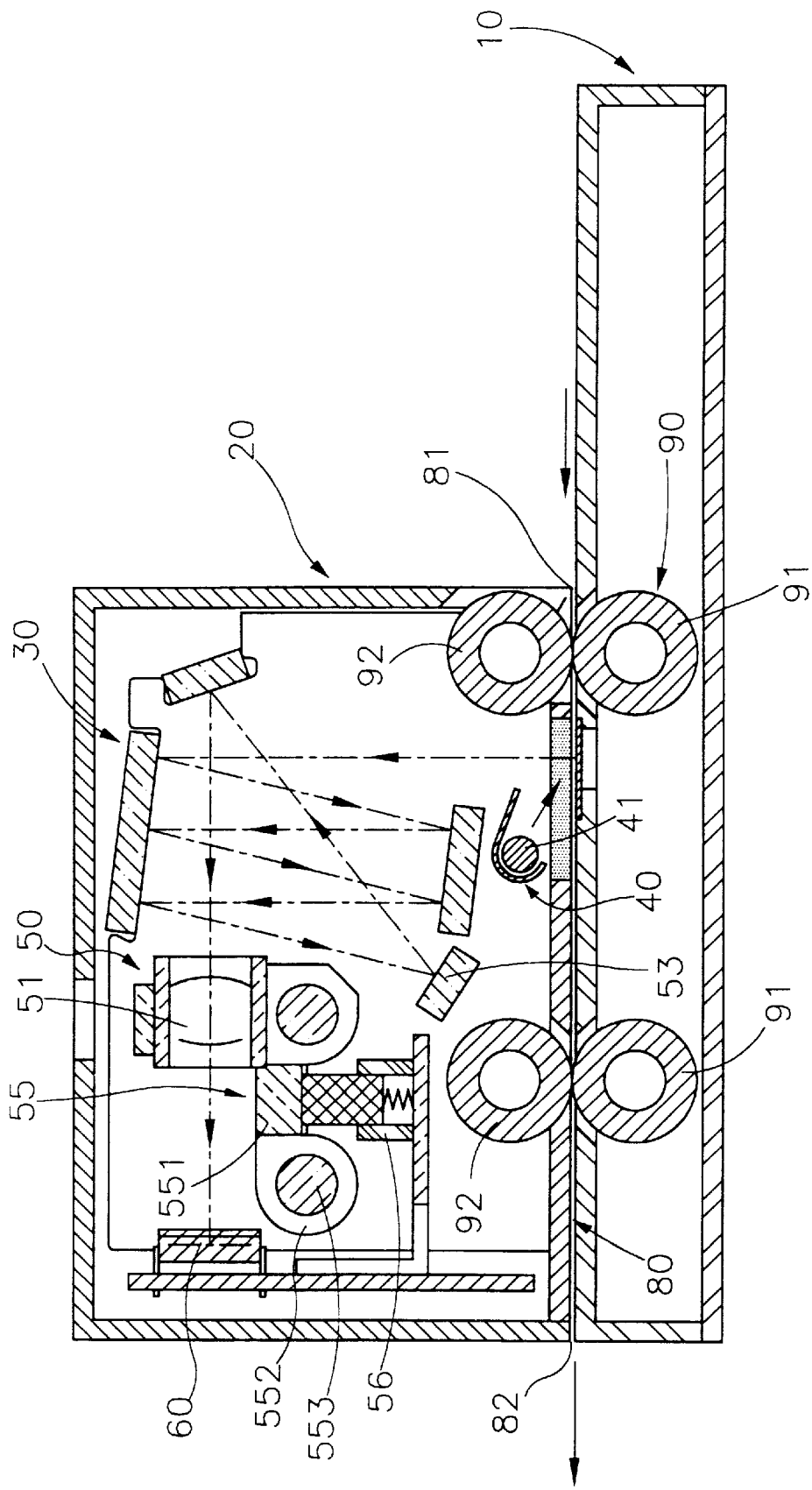
FIG. 2 is a sectional view of FIG. 1, taken along line A—A.
Figure 3:
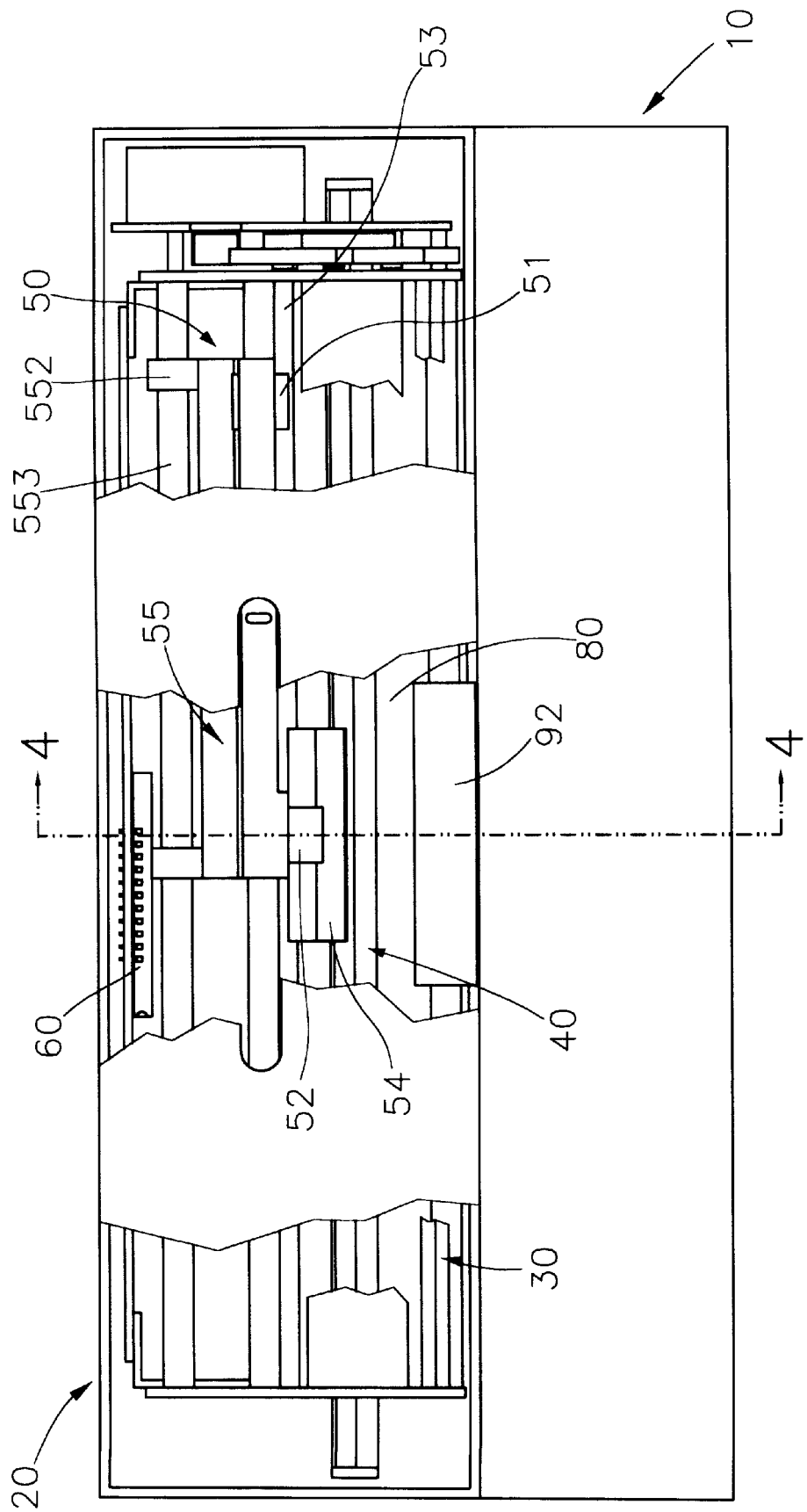
FIG. 3 is a top view of the multiple resolution page scanner of the present invention in the high resolution state.

As shown in all Figs., the multiple resolution page scanner of the present invention mainly comprises a base 10 and a main body 20. A feeding path 80 passes through between the base 10 and the main body 20 in a longitudinal direction. A transport mechanism 90 moves a sheet to be scanned through the feeding path 80 from an intake 81 to an outlet 82. Inside the main body 20, several mirrors 30 and an illuminating system 40 are mounted. A scanned area on the sheet to be scanned is illuminated by the illuminating system 40. Light from the scanned area hits the mirrors 30, passes through a lens system 50, which generates an image of the scanned area on a detector (charge coupled device) 60. The lens system 50 comprises at least two lenses 51, 52 and at least two mirror groups 53, 54. The lenses 51, 52 of the lens system 50 have different focal lengths, leading to images of different resolutions. Alternative reflecting by one of the mirror groups 53, 54 varies the length of the light path and thus the resolution of the image of the scanned area. By mounting the lens system 50 on a gliding support 55, then by moving gliding support 55, let one of the at least two lenses 51, 52 and one of the at least two mirror groups 53, 54 is brought into the light path in front of the detector 60. Thereby operation at various resolutions is attained, allowing to scan various kinds of material and avoiding the need to purchase several scanners with different resolutions, thus saving space and cost.

Referring to FIGS. 1–4, the transport mechanism 90 comprises several first rollers 91 on the upper side of the base 10 and several second rollers 92 on the lower side of the main body 20, the positions of which correspond to the positions of the first rollers 91 for transporting the sheet to be scanned in the longitudinal direction. Either the first or second rollers 91, 92 is driven by a motor. Springs (not shown) maintain a suitable pressure between the first rollers 91 and the second rollers 92. So sheets of various thicknesses will be transported by the transport mechanism 90 through the feeding path 80 towards the outlet 82, so as to be illuminated by the illuminating system 40, with their image being projected to the mirrors 30.

The illuminating system 40 is a reflection light source 41, projecting light into a certain direction to illuminate a certain area on the feeding path 80, the scanned area. While the sheet to be scanned is moved along the feeding path 80 and the scanned area is illuminated by the reflection light source 41, the image of the sheet to be scanned is projected along the light path to the mirrors 30, reflected there, then passes through the lens system 50 and is read by the detector 60.

The lens system 50 mainly comprises the at least two lenses 51, 52, the at least two mirror groups 53, 54, and the gliding support 55. The at least two lenses 51, 52 have different focal lengths. They are arranged at a suitable transverse distance to each other. The at least two mirror groups 53, 54 are respectively mounted at positions which correspond to the positions of the at least two lenses 51, 52 and which lead to light paths of varying lengths, corresponding to the varying focal lengths of the lenses 51, 52 and let the light coming from the mirrors 30 alternatively pass through one of the at least two lenses 51, 52.

The gliding support 55 has a connecting plate 551, connecting to the at least two lenses 51, 52 and to at least one of the at least two mirror groups 53, 54, allowing them to glide in the transverse direction. Several gliding elements 552 are attached to the connecting plate 551. The gliding elements 552 are formed as tubes with axes in the transverse direction. The gliding elements 552 surround guiding elements 553 of a corresponding number, guiding and limiting the movement of the gliding elements 552 in the transverse direction. The gliding support is driven manually or by a motor (not shown), which is controlled manually or by software, moving the at least two lenses 51, 52 and at least one of the at least two mirror groups 53, 54 in the transverse direction to be alternatively brought into the light path in front of the detector 60 for operating at various resolutions.

Referring to FIG. 5, the gliding support 55 has a blocking unit 56. The blocking unit 56 comprises at least one positioning notch 561 on the connecting plate 551 and at least one blocking element 562 mounted on the main body 20. The blocking element 562 has a blocker 563 and a spring 564. When one of the at least two lenses 51, 52 are brought in front of the detector 60, at least one of the at least one blocking element 562 with the blocker 563 engages with the corresponding of the at least one positioning notch 561 and ensures stable positioning of the lenses 51, 52. For moving the gliding support 55 with the at least two lenses 51, 52, the blocker 563 is movable away from the positioning notches 561 against the elastic force of the spring 564, allowing the gliding support 55 to move freely.

Since the lens system 50 of the multiple resolution page scanner of the present invention comprises at least two lenses 51, 52 and at least two mirror groups 53, 54, the detector 60 is provided with images of various resolutions of the sheet to be scanned. So various resolutions are selectable by the user for the scanning of material of various sorts. The user is not only saved from purchasing several scanners to meet the demands of scanning material of all sorts, but also does not need to dedicate much space for several scanners.

Figure 6:
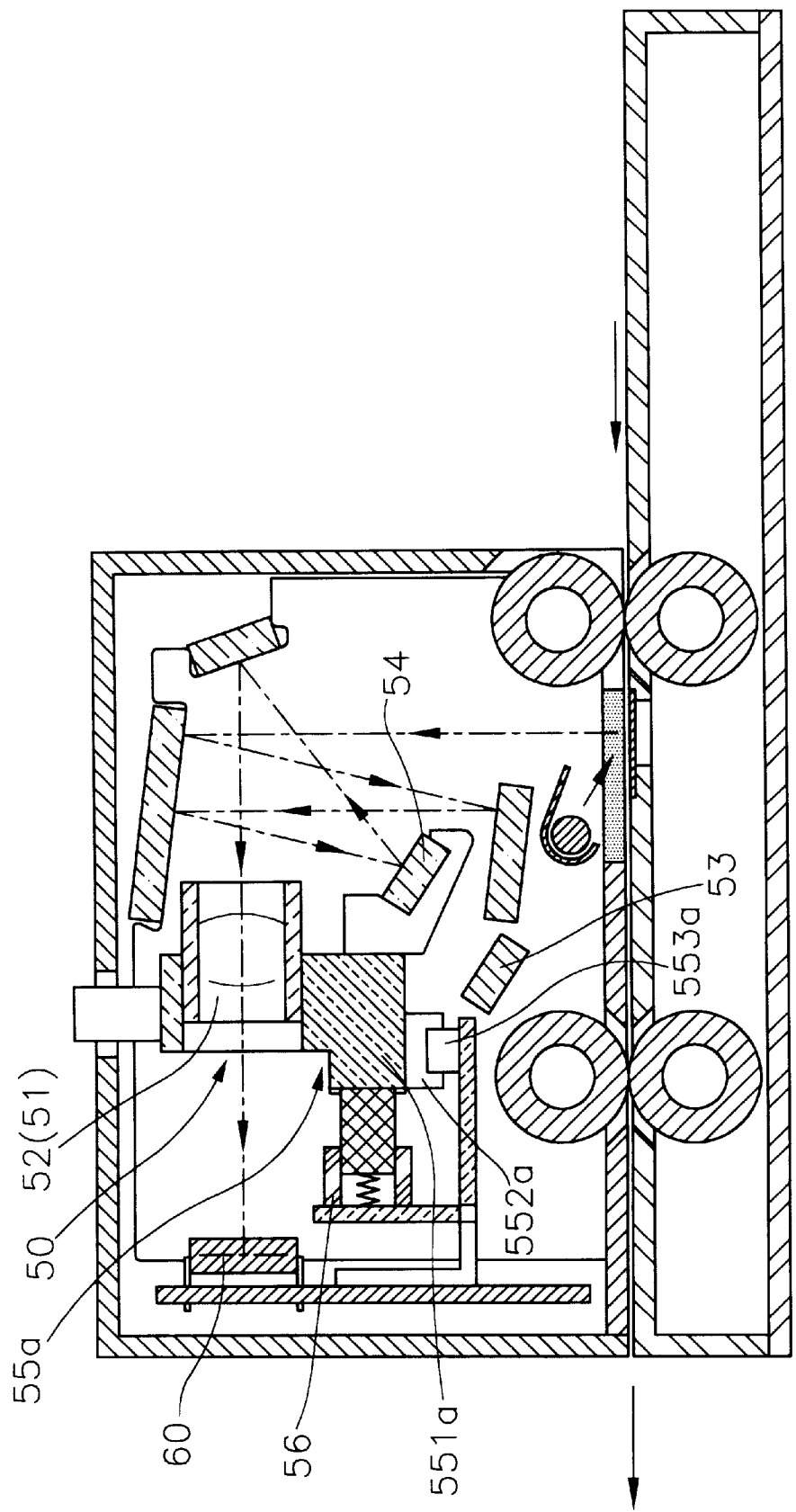
FIG. 6 is a schematic illustration of the present invention in a second embodiment, showing another gliding support for the lens system.

Referring to FIG. 6, in a second embodiment of the multiple resolution page scanner of the present invention, a gliding support 55a is substituted for the gliding support 55. The gliding support 55a has a connecting plate 551a, to which several gliding elements 552a are attached. Several guiding elements 553a extend in the transverse direction, with the gliding elements 552a gliding thereon. Thereby the at least two lenses 51, 52 and at least one of the at least two mirror groups 53, 54 are movable in the transverse direction and are thus alternatively brought in front of the detector 60, so as to allow for scanning of the sheet to be scanned at various resolutions.

Figure 7:
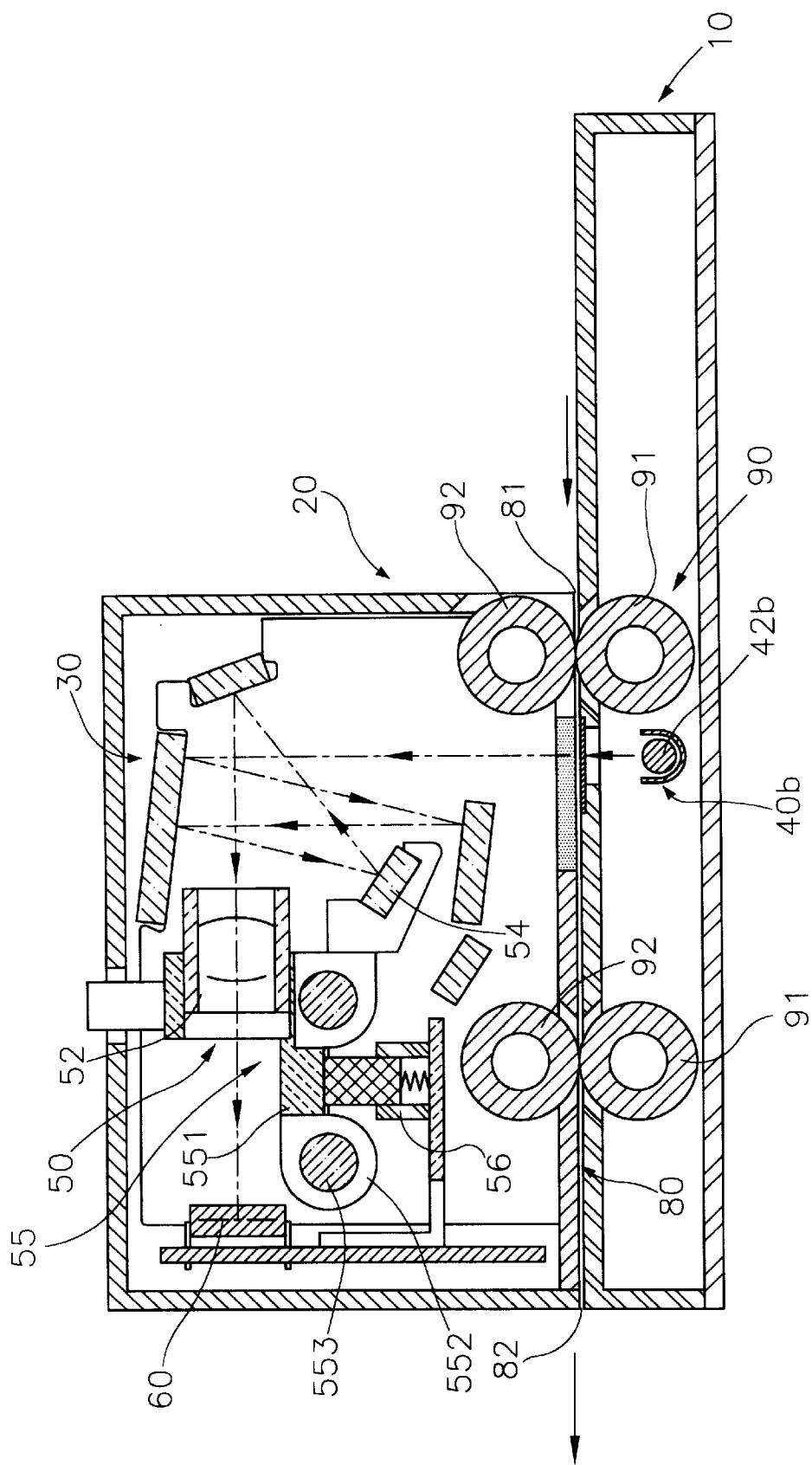
FIG. 7 is a schematic illustration of the present invention in a third embodiment, showing the illumination of the scanned area by transmission.

Referring to FIG. 7, in a third embodiment of the present invention, an illuminating system 40b is mounted in the base 10, projecting light into a certain direction to illuminate a certain area on the feeding path 80, the scanned area, and to the mirrors 30. So the illuminating system 40b is a transmission light source 42b, suitable for scanning transparents.

Figure 8:
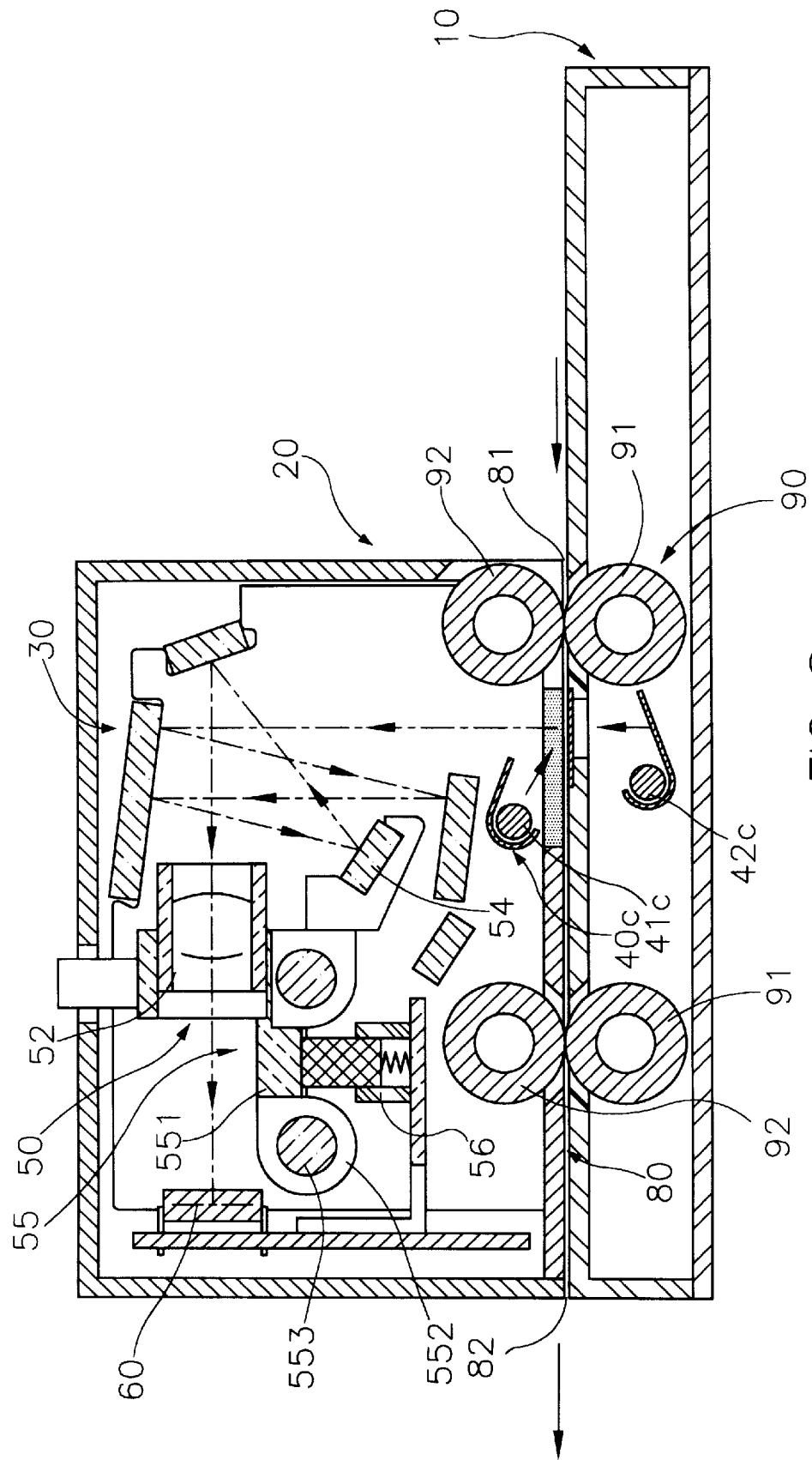
FIG. 8 is a schematic illustration of the present invention in a fourth embodiment, showing the another illumination of the scanned area by transmission.

Referring to FIG. 8, in a fourth embodiment of the present invention, an illuminating system 40c is provided, which comprises a reflection light source 41c and a transmission light source 42c for scanning nontransparent as well as transparent material. As shown in FIG. 8, the transmission light source 42b is mounted under a certain angle, as seen from the scanned area. A reflecting element projects light into a certain direction to illuminate a certain area on the feeding path 80, the scanned area, and, after passing through the sheet to be scanned, to the mirrors 30.

Figure 9:
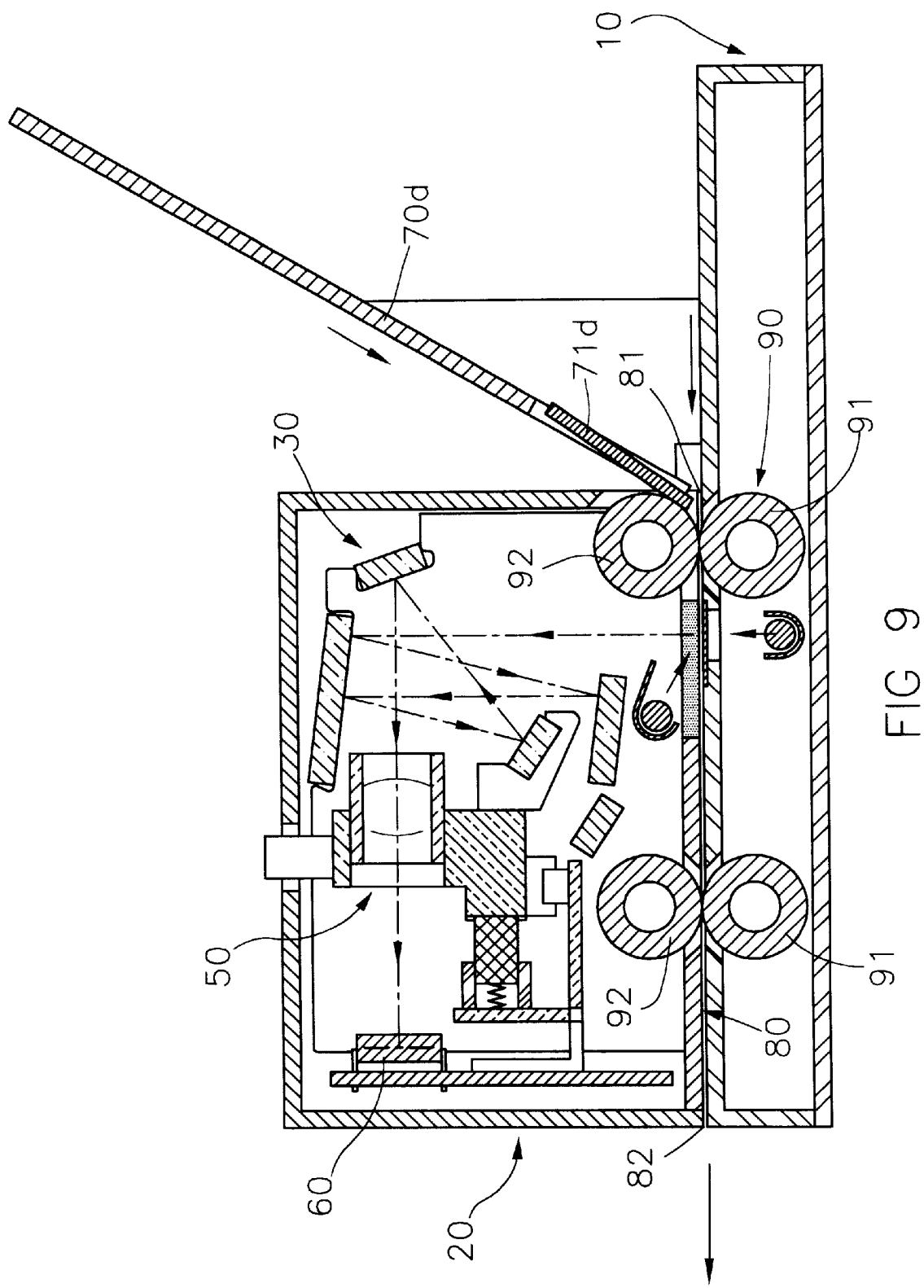
FIG. 9 is a schematic illustration of the present invention in a fifth embodiment, showing a sheet support.

Referring to FIG. 9, in a fifth embodiment of the present invention, a sheet support 70d is additionally provided. The sheet support 70d is a flat plate, mounted on the outside of the intake 81 of the feeding path 80 for supporting sheets to be scanned. A sheet separator 71d is mounted close to the intake 81 for feeding the sheets to be scanned that are lying on the sheet support 70d one by one automatically or manually into the feeding path 80. By alternatively using or removing the sheet support 70d, normal documents as well as relatively thick, smooth, not foldable photographs can be fed into the feeding path 80.

Figure 10:
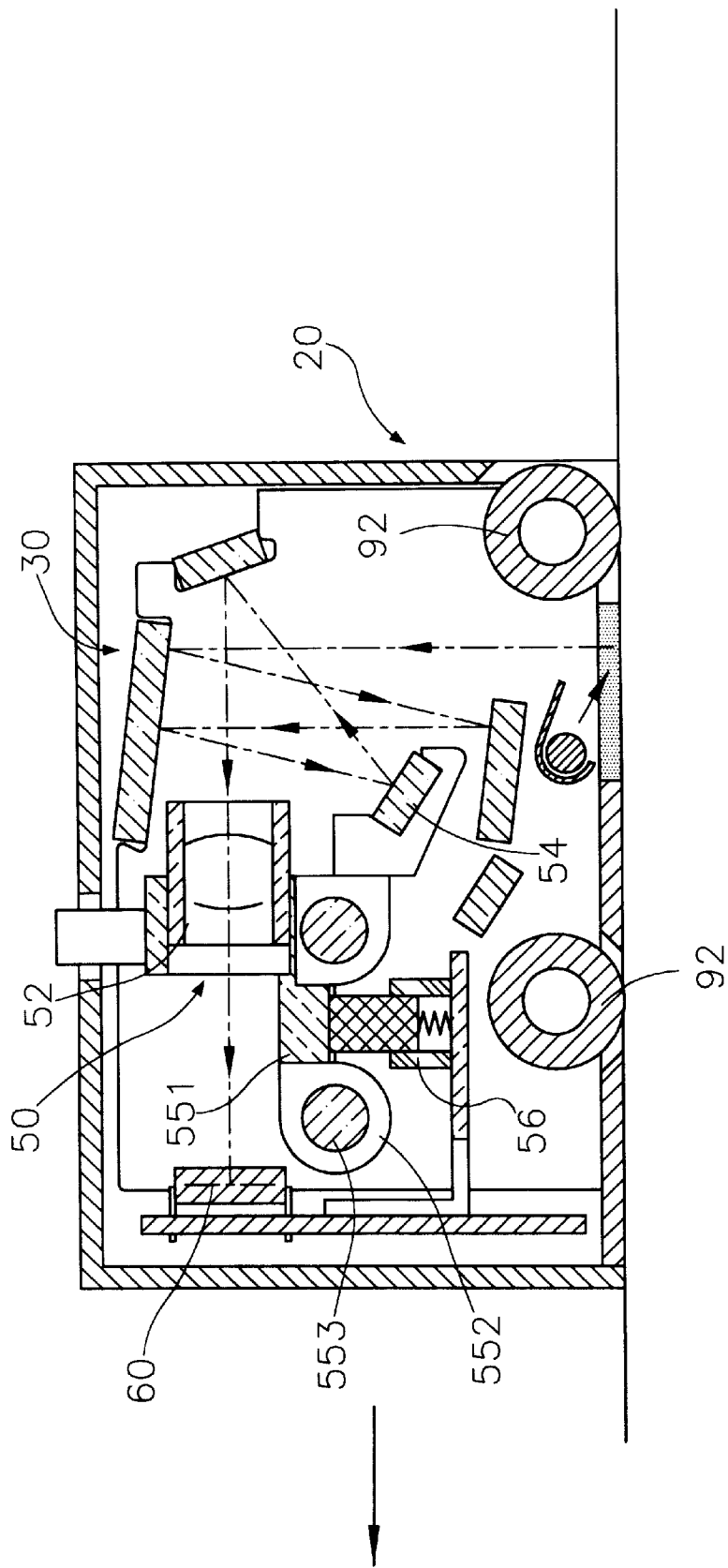
FIG. 10 is a schematic illustration of the present invention in a sixth embodiment.

Referring to FIG. 10, in a sixth embodiment of the present invention, the main body 20 is separated from the base 10 to be used as a hand-held scanner.

Figure 11:
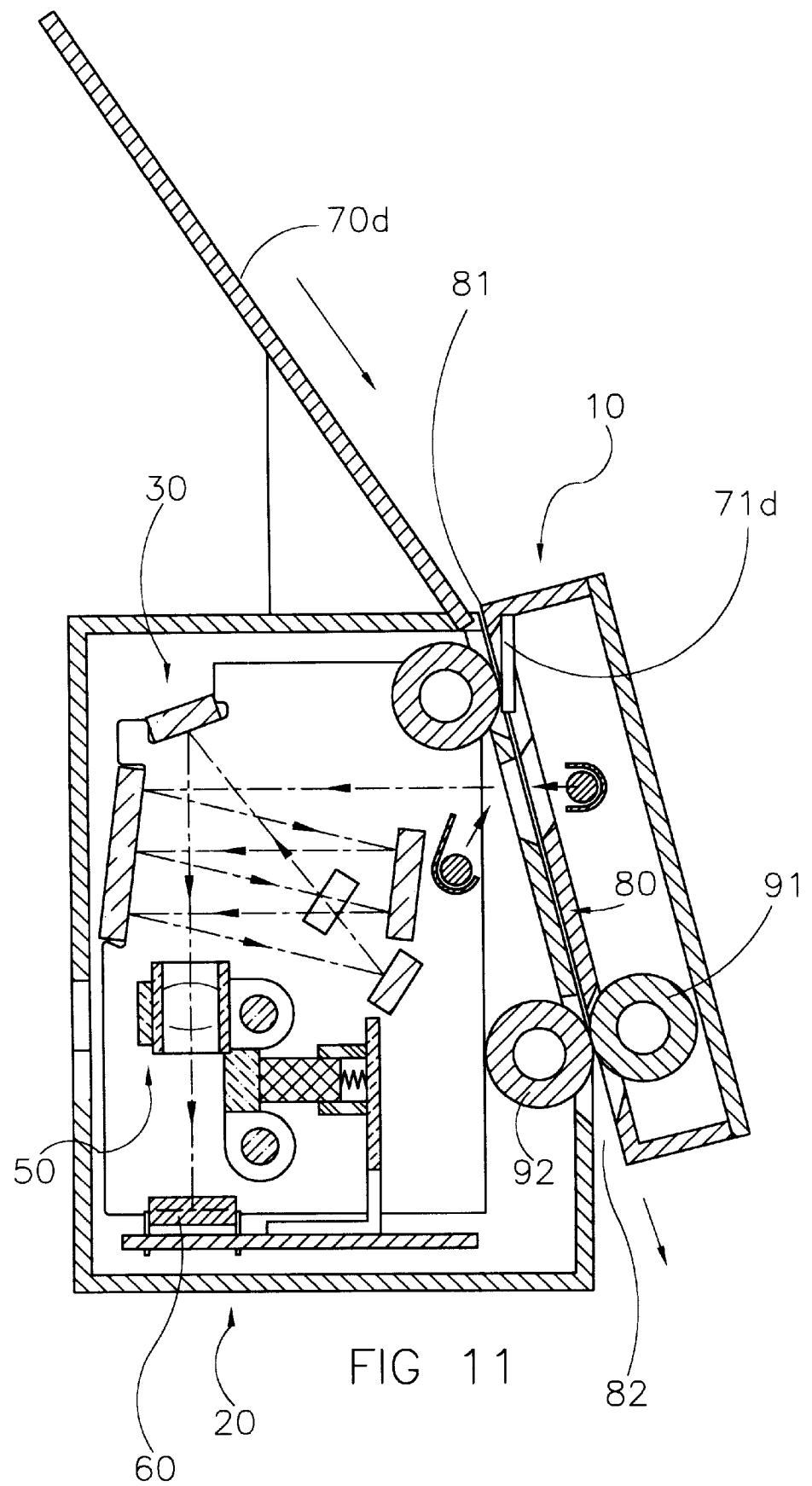
FIG. 11 is a schematic illustration of the present invention in a seventh embodiment.

Referring to FIG. 11, in a seventh embodiment of the present invention, the position of the base 10 and the main body 20 are arranged in another way, providing another way of operation.

What is claimed is:

1. A multiple resolution page scanner comprising a base; a main body and a feeding path in a longitudinal direction between said base and said main body for passing through a sheet to be scanned from an intake to an outlet, said main body having a plurality of mirrors, a lens system and a detector; a transport mechanism, which has at least one first roller on said base and a corresponding second roller on said main body for transporting said sheet in said longitudinal direction through said feeding path; said multiple resolution page scanner further having an illuminating system for illuminating a scanned area on said feeding path, such that when said sheet passes through said feeding path, light is projected on said scanned area so that an image of said scanned area is projected on said mirrors and passes through said lens system and reaches said detector, wherein;

said lens system further comprises at least two lenses of different optical resolutions arranged in a transverse direction, and at least two mirror groups respectively mounted corresponding to said at least two lenses, said at least two lenses alternatively being passed through by light reflected from said mirrors; and a gliding support holding said at least two lenses and at least one of said at least two mirror groups such that any of said at least two lenses can be positioned with the corresponding mirror group of said at least two mirror groups corresponding to said detector, said gliding support comprises a connecting plate holding said at least two lenses and at least one of said at least two mirror groups, several gliding elements, attached to said connecting plate, and several guiding elements extending in said transverse direction, guiding said gliding elements in a transverse movement, wherein said at least two lenses and at least one of said at least two mirror groups are moved by said transverse movement of said gliding elements to be alternatively positioned corresponding to said detector, said gliding support has a blocking unit for stable positioning of any of said at least two lenses corresponding to said detector such that by moving said gliding support, one of said at least two lenses is brought in a position corresponding to said detector for choosing a certain scanning resolution, said blocking unit comprises;

at least one positioning notch, mounted on said connecting plate;

at least one blocking element, mounted on said main body; and at least one blocker, respectively mounted on said at least one blocking element for engaging with said at least one positioning notch;

wherein by moving said gliding support, any of said at least two lenses is positioned corresponding to said detector, at least one of said at least one blocker engages with at least one of said at least one positioning notch, such that said at least two lenses are stably positioned corresponding to said detector.

2. A multiple resolution page scanner according to claim 1, wherein said at least one positioning notch is mounted on said main body and said at least one blocking elements is mounted on said connecting plate.

3. A multiple resolution page scanner according to claim 1, wherein said at least one blocker is respectively connected to said at least one blocking element by a spring, such that, for moving said gliding support, said blocker is pushed towards said blocking element, disengaging from said positioning notch.

* * * * *